Jan. 6, 1925.
L. P. REISS
ICE HOUSE DOOR
Filed Jan. 7, 1924
1,521,836
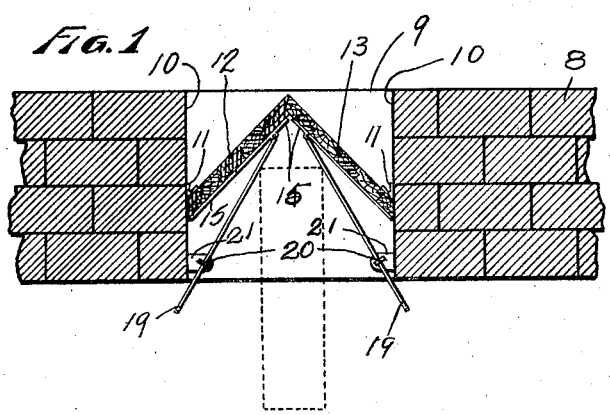
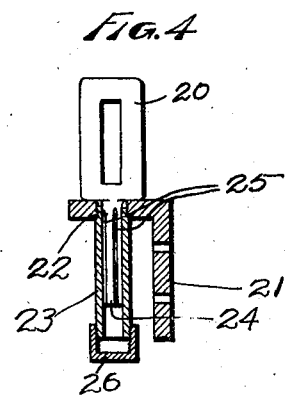
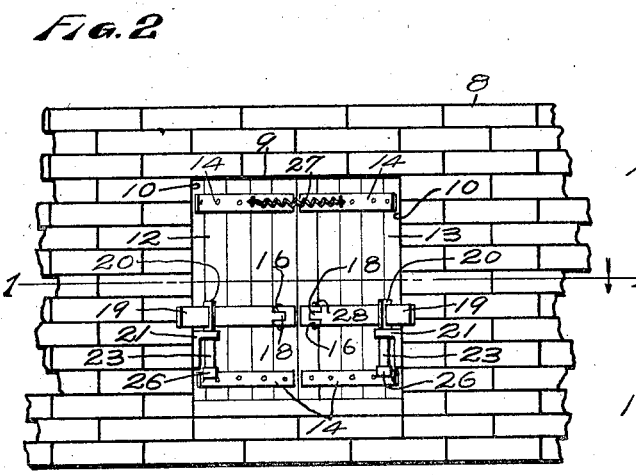
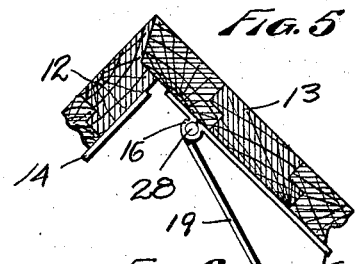
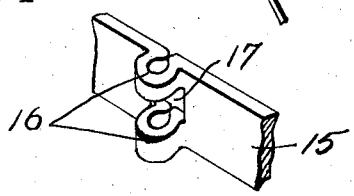
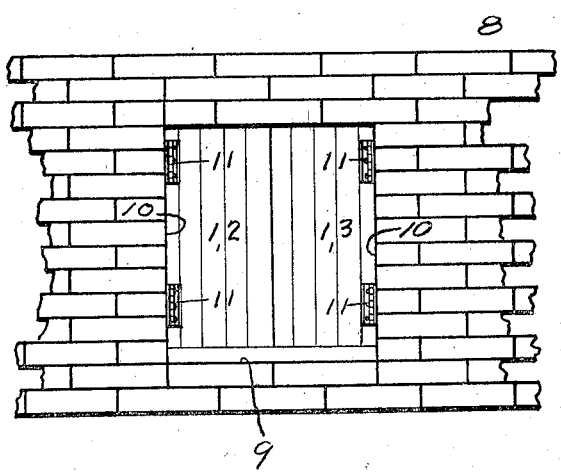
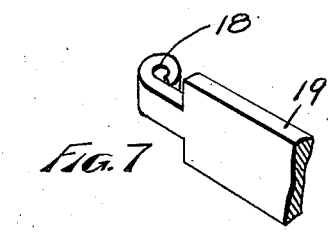
INVENTOR
LOUIS P. REISS
By Edward E. Longan
ATTY.

Patented Jan. 6, 1925.

1,521,836

UNITED STATES PATENT OFFICE.

LOUIS P. REISS, OF MARION, ILLINOIS.

ICE-HOUSE DOOR.

Application filed January 7, 1924. Serial No. 684,917.

*To all whom it may concern:*

Be it known that I, LOUIS P. REISS, a citizen of the United States, and resident of the city of Marion, county of Williamson, and State of Illinois, have invented certain new and useful improvements in Ice-House Doors, of which the following is a specification containing a full, clear, and exact description, reference being had to the accompanying drawings, forming a part thereof.

My invention relates to improvements in ice house doors and has for its primary object a door designed for the delivery opening in ice storage houses which is self-closing and which will permit only a minimum amount of outside air to enter the storage house.

A further object is to construct a door for ice houses which is opened automatically by the cake of ice and which closes immediately after the ice has passed through the door.

A still further object is to construct an ice house door which is provided with levers, the levers adapted to contact with the cake of ice while passing from the storage house and open the doors so that the doors themselves do not bear any of the impact of the ice.

In the drawings:

Fig. 1 is a horizontal fragmental section of my improved door in position in an ice storage house taken on the line 1—1 of Fig. 2;

Fig. 2 is an elevation of a fragment of the wall showing the door in position and viewed from the inside of the storage house;

Fig. 3 is a similar view viewing the same from the outside.

Fig. 4 is an enlarged view with portions in section of the lever guides employed;

Fig. 5 is an enlarged fragmental view of the doors illustrating their meeting point;

Fig. 6 is a fragmental perspective view of a strap in which the lever is hinged; and Fig. 7 is a fragmental perspective view of the hinged end of the lever.

In the construction of my device 8 indicates the wall of an ice storage house. This wall is provided with one or more opening 9 which are preferably rectangular and have vertical walls 10. Secured to the walls 10 are hinges 11 which may be of any desired shape. Carried by the hinges 11 are door members 12 and 13, these members are preferably made of heavy timber and are shiplapped as illustrated in Figs. 1 and 5, so as to make air tight joints. The door members are provided with straps 14 to which the timbers out of which the doors are constructed are secured. The door members are also provided with straps 15, which straps are provided with integrally formed eyes 16 which are spaced apart, and a cut-away portion 17. The cut-away portion is adapted to receive the eye 18 formed integral with the lever 19. These levers are for the purpose of opening the doors and each has the eye 18 formed on one end only. The levers 19 extend through lever guides 20 which are pivotally carried by brackets 21. These brackets are secured to the wall 10 and adjacent the inside of the wall 8. The bracket 21 is provided with a screw threaded opening 22 in which a pipe 23 is secured. The inside diameter of the pipe 23 is approximately the diameter of the shank 24 formed integral with the lever guide 20. The shank 24 is preferably grooved as at 25 so that the pipe 23 may be packed with grease and this grease forced upward into the groove 25 so as to lubricate the shank and permit its ready turning.

The lower end of the pipe 23 is closed by means of a cap 26, this cap serves not only as a closure but is also for the purpose of forcing grease upward and into the groove 25.

Secured to the doors near their upper ends is a coil spring 27 which is for the purpose of drawing the doors together after they have been opened. My doors when in closed position are in the shape of a V with the point toward the outside of the wall 8, as illustrated in Fig. 1.

If found desirable the various joints between the door and the storage house and between the door members may be suitably weatherstripped.

The strap 15 and lever 19 are preferably secured together by means of pin 28, although this structure may be varied without departing from the spirit of my invention.

After my device have been installed as illustrated in Figs. 1, 2 and 3 and ice is delivered through the opening, the cake of ice first assumes the position shown by dotted lines in Fig. 1. In this connection it is desirable to state that ice while being delivered from the storage house always rests on one of its narrow faces or rather on its edges and never on the sides or ends. As the cake of ice moves forward its end comes in contact with the levers 19 forcing them or rather their ends apart. This movement opens or spreads the door members and causes the door to open, the lever guides permitting the levers to slide freely therein and also the pivot as the levers move forward and swing with the doors. This opening of the doors places additional tension on the spring 27 and as soon as the cake of ice has cleared the door the spring immediately pulls the doors together.

It also frequently happens in ice storage that two cakes of ice which have their sides abutting will freeze together and on being broken apart one of the cakes will have a lump thereon, this lump however does not affect the operation of my device as the one door is merely opened a little wider during the time that the lump passes the door and immediately comes back in contact with the cake of ice after the lump has passed.

A decided advantage is gained by my construction due to the fact that the door is composed of two sections which separate in the center and as the thickness of the commercial cake of ice is approximately eleven inches, each one of the sections need open only five and one half inches.

The entrance of air however is prevented to a great extent in the following manner— both doors bear against opposite sides of the cake of ice and prevent the entrance of air; the ice being in contact with the sill prevents entrance of air from that point, so the only space by which air can enter the storage house is the small space above the cake of ice and between the edges of the open doors and the upper edge of the wall opening, whereby in the present type of door the entire width of the wall opening and a great deal of its height is necessarily opened which allows a considerable inrush of air and a consequent raising of the temperature in the storage house.

Furthermore by the construction of my device there is practically no shock imparted by the ice while opening the doors because the levers 19 are arranged at an angle which converges toward the center of the door and these levers impart only a pushing action so that ordinary strap hinges can be used to support the door and the consequent battering and destruction of doors eliminated, as is the case where doors are hinged at the top and swing downward and are opened by the impact of the ice against the door itself, this in a short time not only destroys the doors but also tears them loose from the hinges or tears the hinges from the building, as well as necessitating the employment of extremely heavy and consequently expensive hinges.

Furthermore by the use of my improved door it will not be necessary to make any changes in the delivery openings of an ice storage house, this consequently reduces the cost of installation and makes my device applicable to old structures, as well as those under construction because no special opening need be designed or employed.

By the construction of my door, it is possible to cover the hingedly mounted members with an insulating material such as cork board, thereby greatly reducing the infiltration of warm air into the storage room.

Having fully described my invention, what I claim is:—

1. An ice house door composed of a pair of hingedly mounted members meeting in the form of a V, a lever pivotally carried by each of said members and adapted to be contacted with by the cake of ice for opening said doors, means for slidably supporting the free ends of said levers, and means for normally holding said doors in closed position.

2. An ice house door composed of a pair of hingedly mounted members meeting in the form of a V, a lever pivotally secured to each of said members, said levers extending rearwardly at an angle to the members and adapted to be contacted with by the cake of ice for opening said doors, a spring secured to said doors for resiliently holding the same in closed position, and means for slidably supporting the free end of each of said lever openings.

3. An ice house door composed of a pair of hingedly mounted members meeting in the form of a V, a lever hingedly secured at one end to each of said doors for opening the same, a pivoted support for slidably supporting each of said levers adjacent their free ends, and means for returning and normally holding said doors in closed position.

4. An ice house door composed of a pair of hingedly mounted members meeting in the form of a V, straps secured to each of said members, a strap having eyes secured to each of said members intermediate the first mentioned straps, a lever pivotally mounted between the eyes of said second mentioned straps, a pivoted support for supporting the free end of said levers, a spring secured to said doors for normally holding the same in closed position, said doors adapted to be opened by said levers when said levers are contacted with by an object passing therebetween.

In testimony whereof, I have signed my name to this specification.

LOUIS P. REISS.